Feb. 14, 1956 W. A. MUELLER 2,734,948
FILM SYNCHRONIZING MARKER
Filed Dec. 7, 1951

INVENTOR.
William A. Mueller
BY
*Orl R. Grshaw*
ATTORNEY.

United States Patent Office 2,734,948
Patented Feb. 14, 1956

2,734,948
FILM SYNCHRONIZING MARKER

William A. Mueller, Los Angeles, Calif., assignor to Warner Bros. Pictures, Inc., Burbank, Calif., a corporation of Delaware Application December 7, 1951, Serial No. 260,483

4 Claims. (Cl. 179—100.2)

This invention relates to the art of magnetic sound film recording and reproducing, and particularly to a device or unit for placing a start or synchronization mark on a magnetic sound film to aid in combining the sound record on the film with a sound record or picture on one or more other films.

In the production of sound motion pictures, it is well-known that the picture is photographed on one film and the concomitant sound record on a separate film to obtain better quality pictures and sound records and for flexibility of operation. The images on the two films are later combined into a composite print for exhibition purposes. In order to facilitate the proper combination of the picture and sound films during the cutting, editing, and rerecording processes, it is necessary that start or synchronization marks be placed on each film so that they may be properly combined into the composite print.

There are two types of synchronizing processes now in general use in motion picture studios when both films are photographic. The first is by the use of synchronous motors for driving both the picture camera and the sound recorder. When the films are so driven and the motors have reached uniform speed, both the picture and sound films are marked by exposure to synchronizing lamps. In other words, the films are marked "on the run." The other general method of synchronizing films is by the use of marks placed on the film when they are at standstill. This can be done when the systems use self-synchronous motors, wherein the motors are interlocked at standstill and then accelerated in step. In the latter system, the first frame in the picture aperture may be overexposed to provide a start mark and the sound film punched, notched, or marked by a pencil. With the use of magnetic film or tape for recording the concomitant sound, a new marking system for the magnetic film is desirable, particularly one which may be reproduced in a sound reproducer during the editing process when the film is advanced at a speed below the normal sound reproducing speed. It has been found that a standard single gap or conductor head, although usable for marking when the film is running, will not record a signal which is suitable for editing purposes. The present invention is directed to such a marker for a magnetic sound film which may be used in either the "on the run" or "standstill" types of film driving systems.

The principal object of the invention, therefore, is to facilitate the marking of films, the images on which are to be subsequently combined on a single film.

Another object of the invention is to provide an improved start or synchronization marker for a magnetic sound film.

A further object of the invention is to provide a marker for providing a start or synchronization mark on a magnetic sound film either during the advancement of the film or during the standstill periods of the film.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Figure 1:
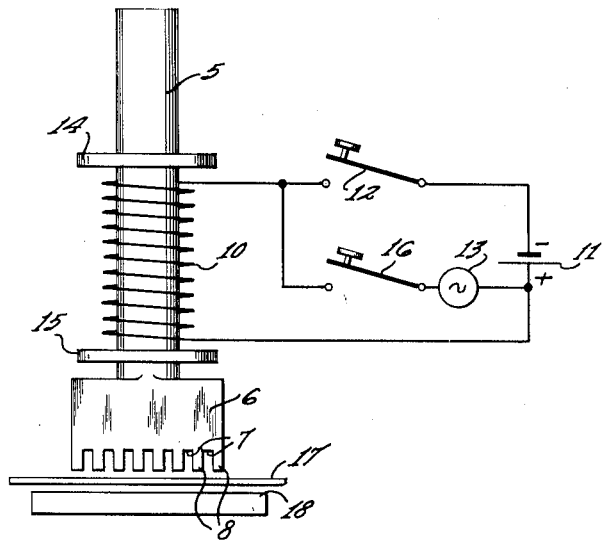
Fig. 1 is a front elevational view of one modification embodying the invention.
Figure 2:
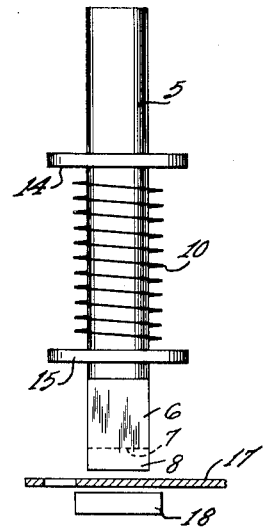
Fig. 2 is a side view of the marker of Fig. 1.

Referring now to the drawings, in which the same numerals identify like elements, a bar of magnetizable material, such as iron or steel 5, has a head section 6 thereon and in the end of which very fine cuts or grooves 7 have been made to provide tip extensions 8 forming a sort of notched or serrated edge. On the central part of the bar is a winding or coil 10, which is connectable to a direct current source 11 when a switch 12 is closed or to an alternating current source 13 when a switch 16 is closed. The winding coil 10 is wound between collar members 14 and 15, the bar 5 extending above the collar 14 to provide a handle for the unit. The head 6 may be rectangular and of the size approximately one-fourth of an inch wide and one-half inch long.

Under the extensions 8, a magnetic film 17 is shown, and under the film is a steel plate 18. Now, when it is desired to place a mark on the film, the switch 12 is closed and the extensions 8 are brought into contact with the film 17 in the manner of using a rubber stamp. The film is thus pressed against the plate 18. The closing of switch 12 polarizes the bar, and the film 17 is magnetized, the signal recorded being a square wave. The frequency or pitch of the reproduced signal will be determined by the fineness of the cuts 7, the width of the extensions 8, and the speed of the film during reproduction. By the use of the plate 18, the amplitude of the recorded signal is increased. Now, when the film 17 is advanced past a magnetic sound reproducing head, a "bleep" or "peep" sound is obtained to indicate the position of the start or synchronization mark. This mark may correspond to the position of the start mark on a picture film made in accordance with any standard photographic process.

By impressing alternating current on the winding 10 from source 13, a signal mark may be recorded on the film 17 when the film is either stationary or moving. Since the signal must only apprise the cutter or editor of the position of the mark, it need only be clearly audible and not of any particular wave shape.

Figure 3:
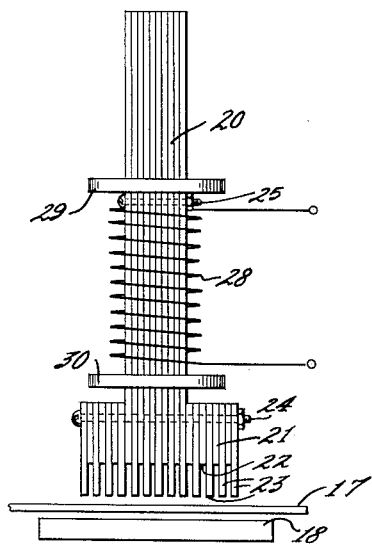
Fig. 3 is a front elevational view of another modification embodying the invention.

Since the editors cutting the magnetic sound film and picture film usually advance them at a slow rate, a high frequency signal forming the start mark is preferred. To obtain such a high frequency mark, the marker shown in Fig. 3 is used. This marker is of similar shape to the unit of Fig. 1, but it is made of thin laminations such as used for transformer cores, the laminations extending throughout the handle portion 20 and down into the head 21. However, every alternate lamination of the handle and head sections terminates at 22, the other laminations, such as 23, extending substantially one-fourth an inch beyond the termination 22. In this manner, a square wave of higher frequency is recordable in the manner described for Fig. 1 when the winding 28 is connected to a direct current source such as shown at 11 in Fig. 1. The laminations may be held together by a bolt 24 through the head portion 21 and a bolt 25 through the handle portion. The coil 28 is positioned between collars 29 and 30 and is wound on the handle portion 20.

Figure 4:
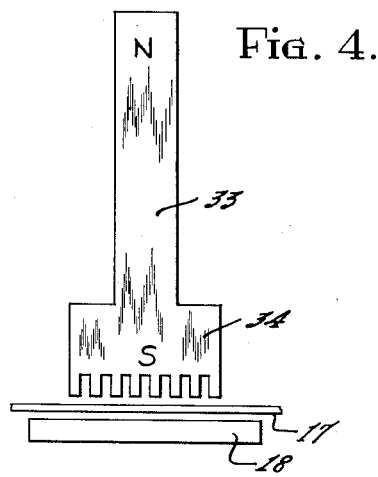
Fig. 4 is a front elevational view of a third modification embodying the invention.

In Fig. 4, a simple and economical form of marker is shown. This unit is a solid iron or steel bar having a handle section 33 and a head section 34 of the same general size, shape, and construction of the head 6 in Fig. 1. However, the bar of Fig. 4 is in the form of a permanent magnet, so as to provide north and south poles, either as indicated or in the reverse order. By using such a permanent magnet, the winding 10, battery 11, and switch 12 of Fig. 1 are avoided, and it is only necessary for the operator to press the unit of Fig. 4 against the film to provide the necessary start or synchronization marks.

Although the notches 7 and extensions 8 are shown in rectangular form, it is to be understood that their form or shape could be sinusoidal, saw-toothed, or any form to provide a series of parallel ridges or extensions. This is true for the modification shown in Fig. 4, while the ends of the longer laminations in Fig. 3 could be rounded, if desired. Also, the ends of the head sections could be cylindrical and the markers rolled on the magnetic film or tape.

I claim:

1. A marking system for magnetic sound film comprising a magnetizable element having an end portion with an alternate series of parallel notches and extensions therein, all of said extensions having their end surfaces adapted to be simultaneously contacted by said film, and means connectable to said element, said means including an alternating current source being adapted to magnetize said extensions to record a reproducible alternating current signal on said magnetic sound film when the end surfaces of said extensions are brought into contact with said film.

2. A marking system for magnetic sound film in accordance with claim 1 in which said alternate notches and extensions are rectangular in shape, a winding surrounding said magnetizable element being provided and to which said alternating source is connectable, said last mentioned means also including a source of direct current energy connectable to said winding.

3. A marking system for magnetic sound film in accordance with claim 1 in which said magnetizable element comprises a plurality of thin laminations, variations in length of said laminations forming said alternate notches and extensions.

4. A marker for providing a reproducible alternating current signal mark on stationary magnetic film, comprising a body composed of thin laminations, alternate laminations extending beyond the ends of the other laminations, the ends of said longer laminations being adapted to contact said magnetic sound film, and means for magnetizing said body portion.

References Cited in the file of this patent

UNITED STATES PATENTS

| | | |
|---|---|---|
| 1,132,016 | Jobke | Mar. 16, 1915 |
| 2,511,121 | Murphy | June 13, 1950 |
| 2,567,812 | Hickman | Sept. 11, 1951 |